No. 709,593. Patented Sept. 23, 1902.
D. C. BOLEY.
APPARATUS FOR TREATING PULVERIZED ORES OF GOLD AND SILVER.
(Application filed Sept. 23, 1901.)
(No Model.) 4 Sheets—Sheet 2.
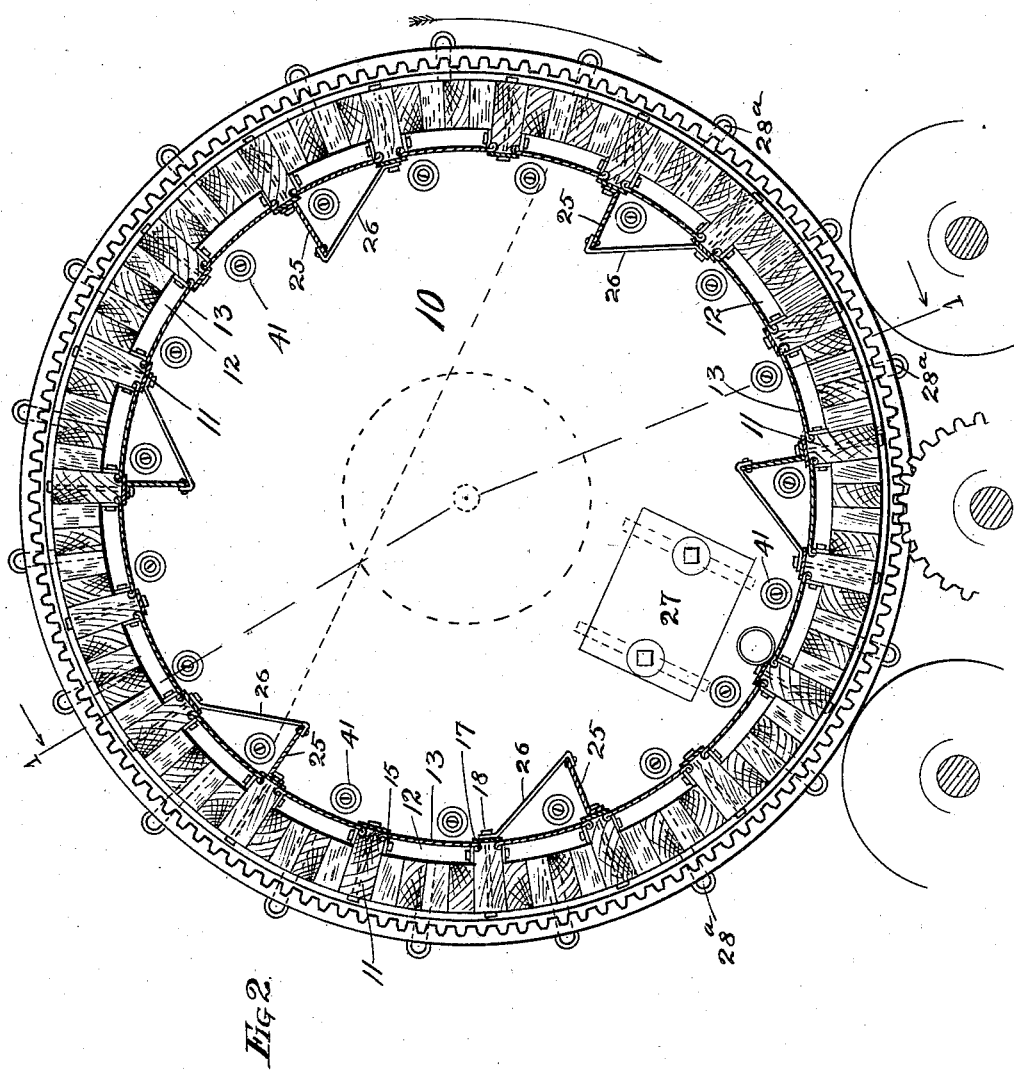

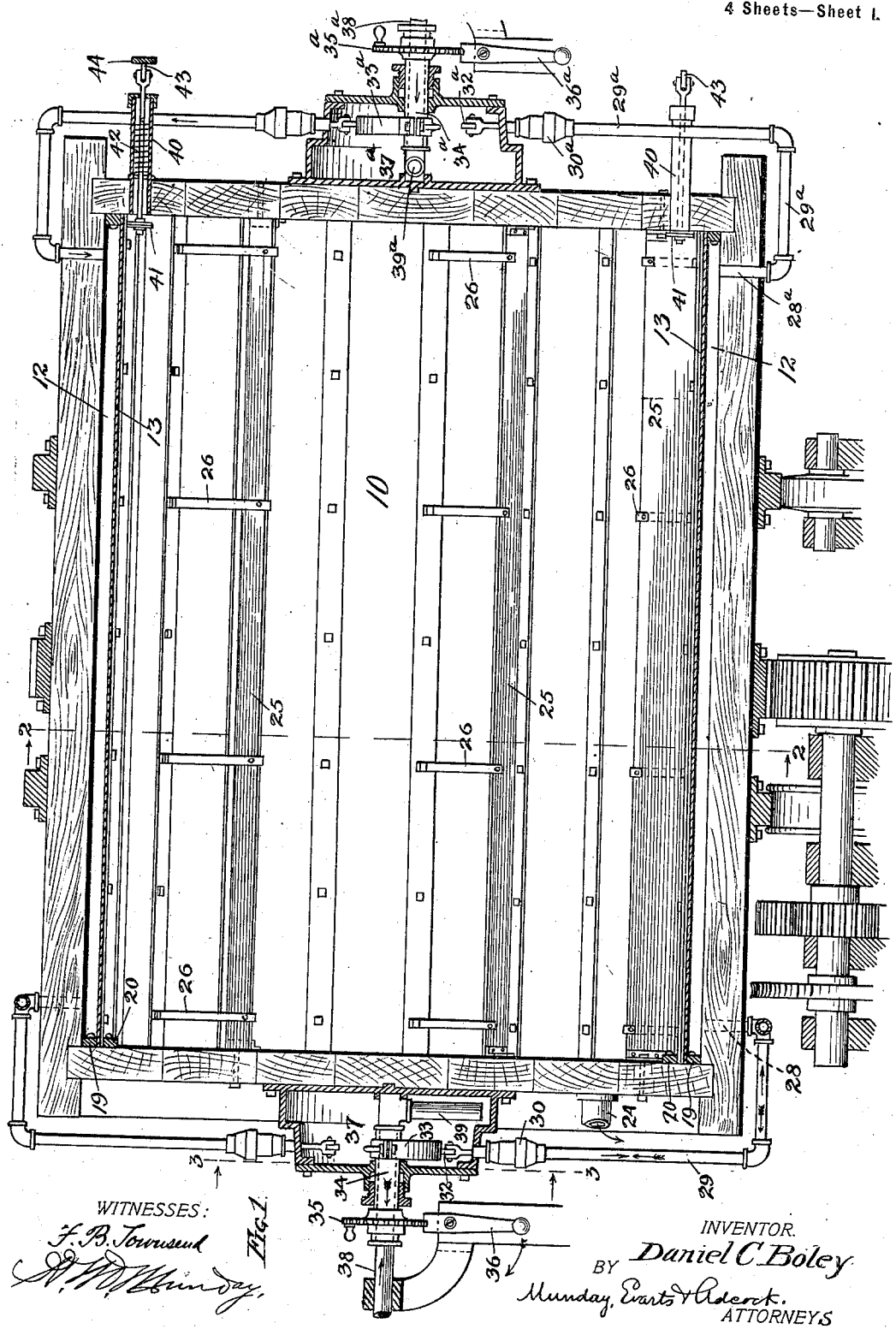

No. 709,593. Patented Sept. 23, 1902.
D. C. BOLEY.
APPARATUS FOR TREATING PULVERIZED ORES OF GOLD AND SILVER.
(Application filed Sept. 23, 1901.)
(No Model.) 4 Sheets—Sheet 3.
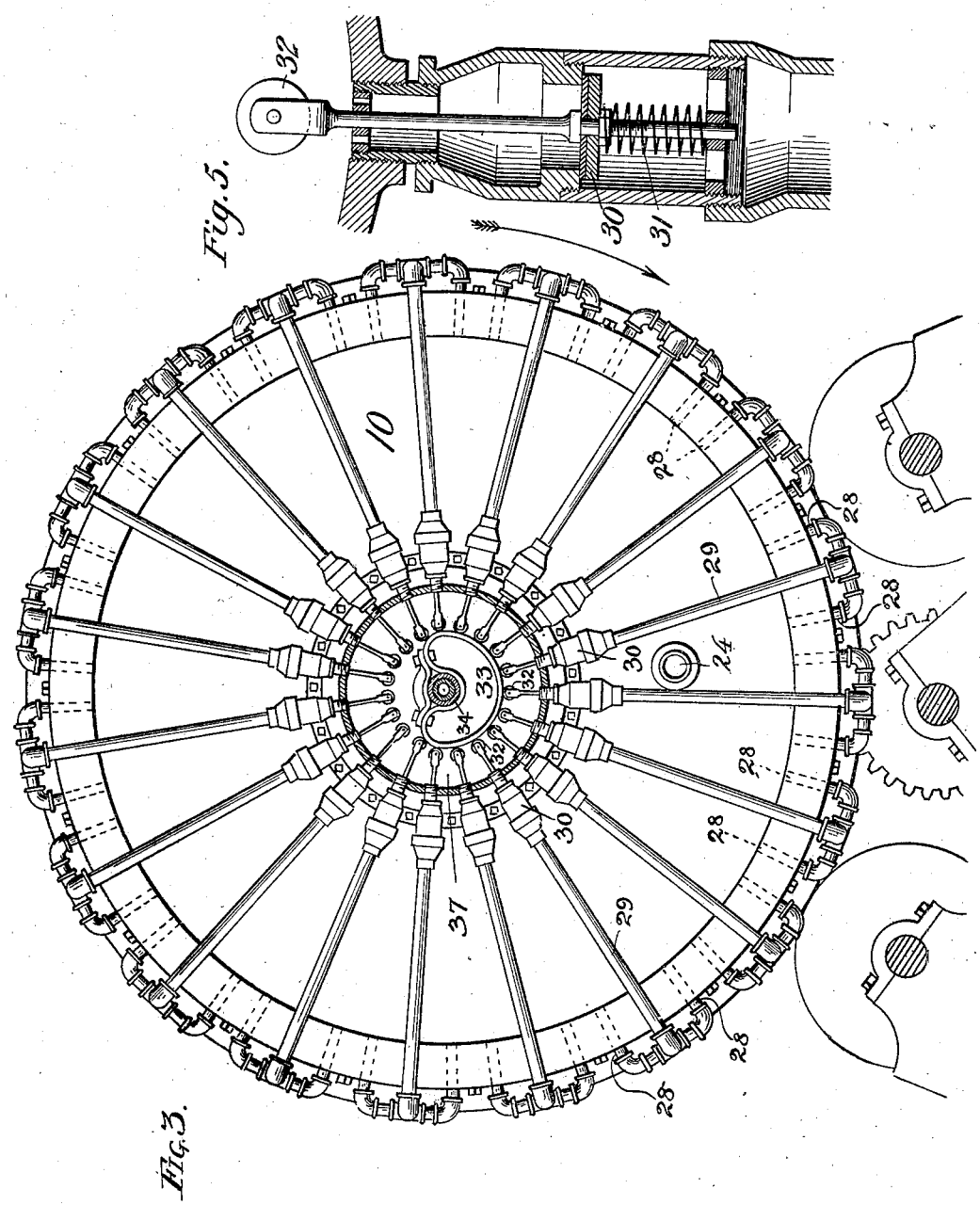
WITNESSES:
INVENTOR.
BY Daniel C. Boley
Munday, Evarts & Adcock.
ATTORNEYS No. 709,593.  
D. C. BOLEY.  
APPARATUS FOR TREATING PULVERIZED ORES OF GOLD AND SILVER.  
(Application filed Sept. 23, 1901.)  
(No Model.)  
Patented Sept. 23, 1902.  
4 Sheets—Sheet 4.
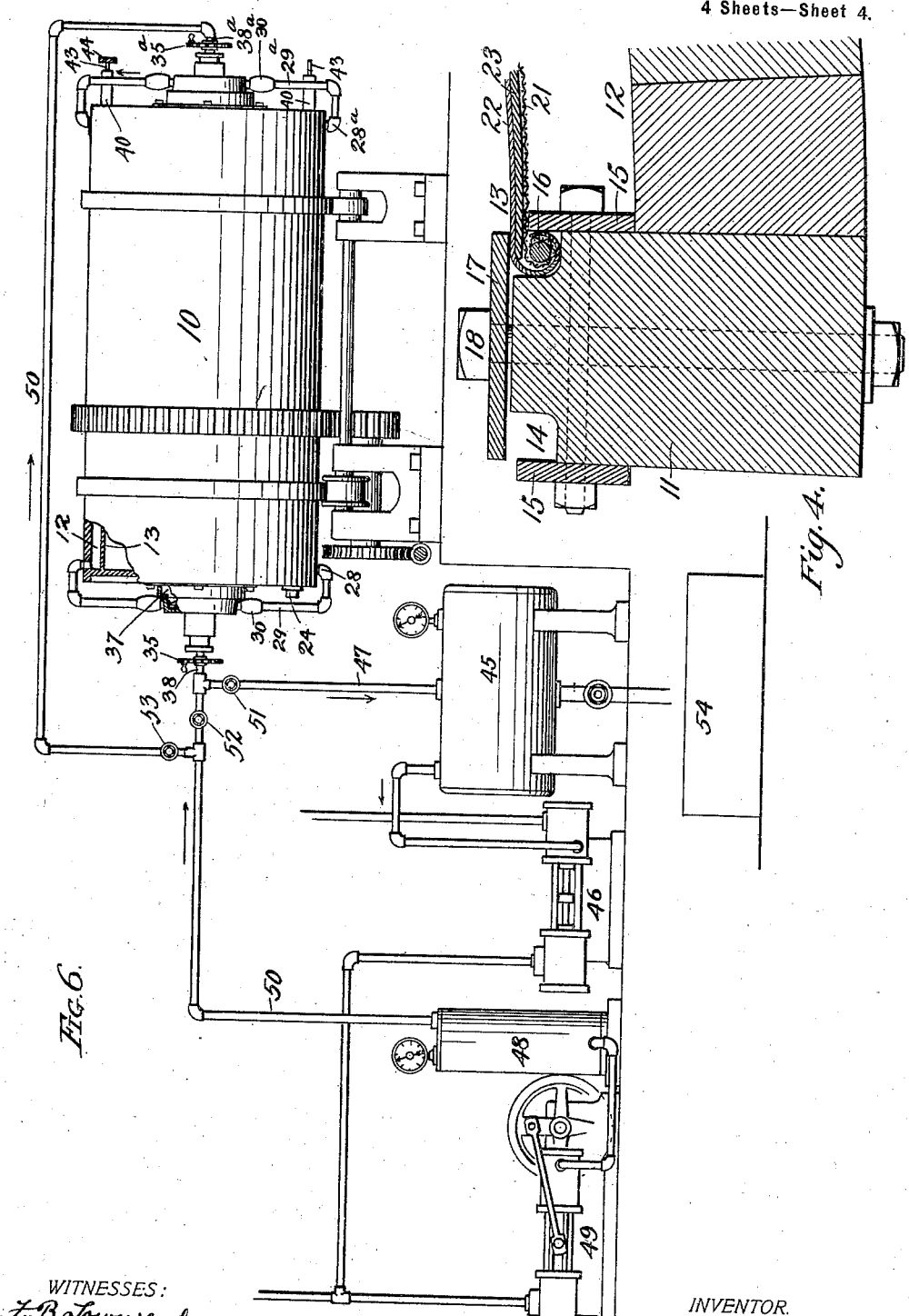
WITNESSES:  
F. B. Townsend  
N. W. Munday
INVENTOR.  
Daniel C. Boley  
BY Munday, Evarts & Adcock,  
ATTORNEYS.

UNITED STATES PATENT OFFICE.

DANIEL C. BOLEY, OF CHICAGO, ILLINOIS, ASSIGNOR TO HENRY BLOCK, OF PEKIN, ILLINOIS.

APPARATUS FOR TREATING PULVERIZED ORES OF GOLD OR SILVER.

SPECIFICATION forming part of Letters Patent No. 709,593, dated September 23, 1902.

Application filed September 23, 1901. Serial No. 76,245. (No model.)

*To all whom it may concern:*

Be it known that I, DANIEL C. BOLEY, a citizen of the United States, residing in Chicago, in the county of Cook and State of Illinois, have invented a new and useful Improvement in Apparatus for Treating Pulverized Auriferous and Argentiferous Ores by Filtration, of which the following is a specification.

The difficulty which has been experienced in treating finely-divided ores by filtration with a cyanid solution is well known. In the case of battery-slimes, which are produced by crushing the ore in the battery in the presence of either water or a cyanid solution, and equally in the case of the fine dust which is produced by dry crushing and which becomes a slime by the addition of moisture, the difficulty in all these arises when attempt is made to filter the material, so as to draw off the moisture, because the slimes collect upon the surface of the filter, and when this collection reaches a certain thickness the fluid will no longer pass through and the filtering-surface must then be cleaned, and this difficulty begins very soon and constantly increases as the filtering proceeds. Attempt has been made to overcome this to some extent by producing a vacuum at the delivery side of the filter, and also attempt to facilitate the filtration by creating an air-pressure on the other side of the filter; and it has been attempted to prevent the collection of this impervious coating of filtrates by stirring and agitating the contents of the filter; but, so far as I know, there has been no organized apparatus heretofore capable of carrying on this work of filtering slimes successfully and economically, and such an organized apparatus is the object of the present invention; and to this end my invention consists in a revolving filter-cylinder having vacuum-chambers and means for supplying air-pressure, the filtering-surface being arranged in cylindrical form inside of the vacuum-chambers and the mode of operation being to agitate the pulverized ore by revolving the cylinder and by the pressure of compressed air and dissolving the gold and the silver in the presence of a solution of potassium cyanid and of the oxygen derived from the compressed air and the removal of the solution containing the gold and silver by filtration, assisted by the vacuum, and the continuous removal of the filtrates from the surface of the filter by their own gravity in the turning of the cylinder and the further cleaning of the filter-surface by a backward blast of compressed air applied after the filtering therethrough ceases; and it further consists in the novel devices and combination of devices more fully hereinafter described and claimed, as will appear from the following specification and claims and the accompanying drawings, which form a part of this specification, and in which—

Figure 1 is a longitudinal vertical section of the filtering-cylinder, taken on the line 1 1 of Fig. 2. Fig. 2 is a vertical cross-section of said cylinder, taken on the line 2 2 of Fig. 1. Fig. 3 is a cross-section of the cylinder, taken on the line 3 3 of Fig. 1. Fig. 4 is an enlarged detail view showing the construction of the filter. Fig. 5 is an enlarged view of one of the valves in the air-pipes; and Fig. 6 is a view upon a smaller scale showing the filter-cylinder together with the additional apparatus, consisting of the vacuum and plenum or compressed-air tanks or chambers, the steam-pumps for operating the same, the pipes and the valves or cocks for controlling the flow of air, and the tank to receive the filtered solutions, the whole being shown in diagrammatic fashion to aid in the understanding of the invention.

Like characters of reference indicate like parts wherever used in the several figures.

In said drawings, 10 represents the cylindrical barrel of the filtering apparatus, which is made of wooden staves and wooden headpieces in the usual manner of such constructions, except that at intervals, as indicated in Fig. 2, a stave 11 is made deeper than the rest, so as to form between these deeper staves all around the interior of the barrel a series of compartments 12, which compartments are separated from the interior of the barrel by the filtering-surface 13. The barrel may be made of metal; but I prefer to make it of wood, which is not acted upon by the cyanid solutions, and the staves of varying thicknesses make tight chambers. The filtering-surface 13 and its method of attachment to the staves 11 is shown in detail at Fig. 4. It will be seen by reference to that figure that to accommodate and secure the filtering fabric the inner corners of the staves 11 are cut with a rabbet 14. On each side of the stave is bolted a plate 15, which I prefer to make of metal, as it is required to stand considerable strain. This plate 15 extends to within a short distance of the top of the stave, and in conjunction with the rabbet 14 forms a groove to receive the sides of the filtering fabric, which sides are rolled onto the metal rods 16. On the top of stave 11 is placed a wooden plate 17, clamped down upon the filtering fabric by means of the bolts 18, thus securely holding the sides of the fabric in place. The ends of the filtering fabric are held in place by cleats 19 20, (see Fig. 1,) secured to the heads of the barrel, a cleat being placed on each side of the fabric. The filtering fabric may be of any ordinary material such as is commonly used for similar purposes; but I prefer to employ a fabric composed of three layers—viz., an outer layer 21, of heavy wire-netting, an inner layer 22, of heavy duck fabric, and an intermediate layer 23, of cocoa-matting. Because of the fact that in the operation of my apparatus air-currents are forced through this filtering material in both directions I have found it very desirable that these three thicknesses of filtering material should be stitched or tied together at short intervals to prevent the air when forced into the barrel from bulging the duck and matting away from the wire-netting.

The filtering barrel or cylinder is banded with the usual cast-iron carrying-rings and provided with the usual tooth-gearing after the fashion of revolving ore driers and roasters, so that it may be revolved by power. The barrel should be mounted so that one end is a little lower than the other to facilitate the drawing off of the contents and the easy flow of the filtered solution to that end of the barrel. In the head of the barrel at this lower end is the filling and discharge bung 24, stopped by a valve or a plug, preferably the latter, and located in the head close to the level of the filtering-surface. When the barrel is to be filled, it is rotated until this bung comes into this uppermost position, and when the contents are to be discharged it is rotated until the bung is in the lowermost position.

Within the barrel and inside the filtering-surfaces are placed at intervals wings 25, standing radially to the barrel and extending lengthwise thereof, their inner edges being supported by braces 26. The purpose of these wings or projections is to carry up the material in the barrel and interrupt the even flow of the pulp, and thus stir and agitate it while the barrel is in motion.

For access to the interior of the barrel a closed manhole 27 is provided.

Communicating with each one of the air-chambers 12, near the lower end of the barrel, is an air-pipe 28, these air-pipes being connected in pairs to pipes 29, each of which latter pipes is provided with a valve 30, (see detail view Fig. 5,) held normally closed by a spring 31, mounted on the lower portion of the valve-stem and having the upper portion of the valve-stem provided with a friction-roller 32. This friction-roller comes into contact with a stationary cam 33, which is mounted on a sleeve 34, said sleeve being provided with a notched wheel 35, which latter can be held in any desired position by means of the detent 36. At the other or higher end of the barrel is a precisely-similar arrangement of chamber, pipes, and valve-stems, which are numbered 28ª 29ª 30ª 31ª 32ª 33ª 34ª 35ª 36ª 37ª 38ª. The only difference is that the cam 33ª at this end is located on the opposite side of the circle from the cam 33 and is shorter, the cam 33 being made long enough to hold out, say, ten or eleven of the valve-stems—that is to say, an area amounting to practically half of the circle—while the cam 33ª is shorter, so that it holds out only one or two of the valve-stems. The ends of the pipes 29 and the valve-stems project into an air or liquid tight chamber 37, which contains also the cam 33, and extending into this chamber in the axis of the valve is the air-pipe 38, the inner end of which is turned radially by the pipe 39, which terminates farther from the center than the end of pipe 29. In the head or higher end of the barrel are placed a series of pipes 40, preferably one for each of the air-chambers 12, and located close to the inner surface of the filtering fabric. Each of these pipes is provided with a valve 41, the stem of which is furnished with a spring 42 and the outer end of the stem with a friction-roller 43. The purpose of these pipes 40 is to open the upper part of the barrel to the atmosphere at a point above the upper level of the liquid contents, and that these pipes may be opened automatically a stationary cam 44 is provided, against which the rollers 43 ride during the short portion of the revolution of the barrel, as will be more fully hereinafter described.

45 is a vacuum-chamber in which vacuum is produced by the vacuum-pump 46. This vacuum-chamber is connected by the pipe 47 to the pipe 38, above mentioned.

48 is a plenum or compressed-air tank which is kept filled by the compressed-air pump 49. This plenum-chamber is connected by a pipe 50 with the pipe 38 and also with the pipe 38ª. Cocks 51 52 53 are provided so that the vacuum may be applied to the pipe 38 by opening cock 51 and closing cock 52 or so the plenum may be applied to pipe 38 by opening cock 52 and closing cock 51 and so that the plenum may be applied to pipe 38ª or shut off therefrom by opening or closing cock 53. It will be noted that for each of the pipes 29 there are two pipes 28, as before mentioned. This is an important feature of construction. The purpose is to facilitate the drawing out of the filtered solution from the chambers 12. Owing to the motion of the barrel the fluid contained in these chambers is not stationary, but always runs to the lowest point in the chamber, and of course on the descending side of the barrel this lowest point is at one side of the filter-chamber and on the ascending side of the barrel it is at the other side of the filtering-chamber. By having the two pipes, one entering the filtering-chamber at each side, the result is that whatever the position of the chamber one or other of the pipes is always in position to receive the solution.

The operation is as follows: The cylinder or barrel being empty is turned until the bung occupies a position in the upper part of the barrel, and the plug being taken out of the bung a flexible pipe (not shown) is inserted in the bung-hole, and from an ordinary launder or open trough the material to be treated is introduced into the interior of the barrel, where it falls and rests upon the filtering-surfaces. Suppose this material to be treated consists of battery-slime, as it would be under certain conditions. In such case the liquid material, consisting of finely-pulverized ore and water containing a proper proportion of potassium cyanid, is flowed into the barrel until this vessel is nearly full—not so full, however, but that at least one of the pipes 40 will be above the level of the contents. The inflow is now stopped and the bung plugged up. The barrel is then started to revolve in the direction of the arrow on Fig. 2 and at the same time the cock 52 is opened and the cocks 51 and 53 closed. The result is that the compressed air from the plenum-cylinder 48 is forced through the pipes 29 and 28 into the filter-chamber 12—that is to say, into all of these filter-chambers which occupy the lower half of the barrel, being all of those the valves of which are opened by the cam 33—and this air passes up through the filtering fabric into the pulp or solution above the filters, bubbling up through it constantly and accomplishing two purposes—viz., to assist in agitating the contents of the barrel and also to furnish a liberal supply of oxygen to facilitate the dissolving of the gold and silver contained in the pulp. This latter function is highly important, as the potassium cyanid is thus enabled to act much more quickly. The wings or projections 25, acting on the mass of pulp and water, lift the lower parts thereof constantly on the rising side of the barrel, carry them up, and deliver them back, so that the contents of the barrel are thoroughly agitated. This agitation and aeration is kept up from four to six hours, the time depending somewhat upon the material. By this time the gold and silver should all be thoroughly dissolved, as I have found by practice, and will be found to be all contained in the cyanid solution. While this agitation and aeration is going on, the pipes 40 are opened and closed in turn one after the other by the valve-stem of each in turn riding against the stationary cam 44, so that the upper portion of the barrel above the liquid contents is always kept open to the atmosphere by this means; otherwise the compressed air could not pass freely up through the pulp and produce the oxidizing and agitating effect desired. The next step to be taken is the removal from the barrel by filtration of the cyanid solution which contains the dissolved gold and silver, and this is accomplished as follows: The cock 52 is closed and the cocks 51 and 53 are opened. This admits the plenum to the pipe $38^a$ and induces a vacuum at the pipe 38. The vacuum influences all of the chambers 12, which occupy the lower half of the barrel, while the plenum influences only the upper part of the barrel. This is because of the different positions of the cams 33 and $33^a$. The barrel is caused to continue to revolve in the same manner as before and the solution flows down through the filtering material into the chambers 12, thence through the pipes 28 and 29 into the chamber 37, and filling said chamber 37 above the level of the mouth of the pipe 39 the filtered solution passes along out of the pipe 38 into the pipe 47 and into the vacuum-cylinder, which is emptied when full into a receiving-tank 54. The filtrates cling to the surface; but they are carried up on the rising side of the barrel, and therefore drop off by gravity, more or less; but if any of this material adheres to the surface of the filter and is carried up to the top of the barrel it is there blown off by the compressed air which enters through the pipe $38^a$ into each of the chambers 12 as these chambers reach the upper part of the barrel. Consequently no matter how dense the pulp or filtrations become the surface of each filter on the descending side of the barrel as it enters beneath the mass does so in a clean condition, and the filtering is therefore very rapidly and thoroughly accomplished. The time required for filtering the charge to the required dryness will depend, of course, upon the rapidity with which the barrel is revolved and somewhat upon the percentage of moisture in the charge originally.

Of course whatever moisture is left in the filtrates still contains its proportion of the gold and silver which it holds in solution, and when the filtering has been carried on to as complete dryness as practicable I run in a fresh cyanid solution on the filtrate, cut off the vacuum, apply the air-pressure again, as in the first instance, and revolve the fresh solution with the filtrate for a short time—say half an hour—and then repeat the operation of filtering by applying the vacuum again, as before, until the filtrates are made as dry as practicable, when it will usually be found that all the obtainable values are removed, and it only remains to remove the pulp from the barrel in the preparation of a fresh charge, and this I accomplish by running a supply of water into the barrel, start the same to revolving, stir the filtrates into the water, apply the compressed air into the pipe 38, so that it may blow up through the filters to prevent settling, and when the contents are well stirred and mixed the barrel is stopped with the bung at its lowest position, and while the compressed air is still blowing through the filters to prevent settling I remove the plug from the bottom and permit the contents of the barrel to flow out to waste.

I claim—

1. In an apparatus for treating finely-divided ores by filtration, the combination with a moving filter-surface, of means for creating a vacuum beneath the filter as it passes a portion of its course, and means for producing at a different time an air-pressure backward through the filter, at the same portion of its course, substantially as specified.

2. In an apparatus for treating finely-divided ores by filtration, the combination with a moving filter-surface, of means for creating a vacuum beneath the filter as it passes a portion of its course, and means for producing at the same time an air-pressure backward through the filter as it passes another portion of its course, and with means for producing at a different time an air-pressure backward through the filter, at the same portion of its course, substantially as specified.

3. The combination of the rotatable barrel having around its inside surface a series of chambers separated from the interior of the barrel by filtering fabric, and means for inducing a vacuum in said chambers during a portion of the revolution of the barrel, said means consisting in part of pipes containing valves controlled automatically by a cam caused to operate by the motion of the barrel, substantially as specified.

4. The combination of the rotatable barrel having around its inside surface a series of chambers separated from the interior of the barrel by filtering fabric, means for inducing a vacuum in said chambers during a portion of the revolution of the barrel, and means for producing an air-pressure backward through the filter fabric at a different time, substantially as specified.

5. The combination of the rotatable barrel having around its inside surface a series of chambers separated from the interior of the barrel by filtering fabric, means for inducing a vacuum in said chambers during a portion of the revolution of the barrel, said means consisting in part of pipes containing valves controlled automatically by a cam caused to operate by the motion of the barrel, and means for producing an air-pressure backward through the filter fabric at a different time, substantially as specified.

6. In an apparatus for treating finely-divided ore by filtration, the combination of the rotatable barrel, the series of filtering-chambers around the interior surface of the barrel, the filtering fabric separating the chambers from the barrel, the radial longitudinal internal wings, the means for inducing a vacuum or plenum in the chambers consisting of pipes provided with valves leading to an axial pipe connected with a vacuum and plenum reservoir, the connection being controlled by cocks, substantially as specified.

7. The combination of the rotatable barrel, the series of filtering-chambers separated from the interior of the barrel by filtering fabric and means for inducing a vacuum in said chambers during a portion of the revolution of the barrel, and means for drawing the liquid contents out of said chamber, consisting in part of pipes, each chamber having two outlets to the pipes, so that the liquid contents will flow out whatever the position in the vacuum zone the chamber may occupy during the rotation of the barrel, substantially as specified.

DANIEL C. BOLEY.

Witnesses:
 JOHN W. MUNDAY,
 H. M. MUNDAY.